United States Patent [19]

Pylaev et al.

[11] 3,932,286

[45] Jan. 13, 1976

[54] ANTIFRICTION POLYMERIC MATERIAL AND A COMPOSITION THEREOF

[76] Inventors: Nikolai Ivanovich Pylaev, ulitsa Kontorskaya, 18, kv. 52; Valery Yakovlevich Ponomarev, prospekt Metallistov, 82, kv. 82, both of, Leningrad, U.S.S.R.

[22] Filed: Jan. 21, 1975

[21] Appl. No.: 542,845

[52] U.S. Cl. .................. 252/12.4; 252/12; 252/12.2
[51] Int. Cl.² ...................... C10M 5/00; C10M 7/00
[58] Field of Search ........... 252/12, 12.2, 12.4, 12.6

[56] References Cited
UNITED STATES PATENTS

| | | | |
|---|---|---|---|
| 3,453,208 | 7/1969 | Gallagher et al. | 252/12.4 |
| 3,523,080 | 8/1970 | Delaplace | 252/12.4 |
| 3,575,857 | 4/1971 | Graver | 252/12.4 |

*Primary Examiner*—Delbert E. Gantz
*Assistant Examiner*—I. Vaughn
*Attorney, Agent, or Firm*—Steinberg & Blake

[57] ABSTRACT

An antifriction polymeric material intended for use in friction members designed to withstand specific pressures of up to 400 kg/sq.cm. and sliding speeds of up to 0.1 m/sec., which is formed as a cured composition comprising the following components, parts by weight:

| | |
|---|---|
| epoxy binder | 36 – 48 |
| glass cloth or fiberflass | 42 – 44 |
| polytetrafluoroethylene of crystallinity 0.60 and particle size from 0.3 to 1.5 cu.mm. | 8 – 22. |

7 Claims, No Drawings

ANTIFRICTION POLYMERIC MATERIAL AND A COMPOSITION THEREOF

The present invention relates to antifriction polymeric materials and compositions for antifriction materials.

Those skilled in the art are familar with numerous antifriction materials, both metallic and non-metallic.

The most widespread materials for friction members, for instance those employed in hydraulic turbines, are bronze and wood laminate.

With the growth of specific loads to be withstood by hydraulic turbine friction members, said materials have ceased to meet the now more stringent reliability requirements; more serious still, they are entirely unsuitable for lubrication-free conditions.

It is likewise known in the art to employ a range of polymeric materials on the basis of polyamide-, phenolic-formaldehyde- and other synthetic resins.

These, however, are rarely employed for hydraulic turbine friction members, for they lack the required set of properties, viz. ability to withstand specific pressures of from 250 to 400 kg/sq.cm., water- and oil resistance, low friction coefficient under lubrication-free conditions in water or mineral oil media, and ability to resist tropical conditions.

Thus, materials on the basis of polyamides and phenolic resins are lacking in water resistance; those based on polytetrafluoroethylene have inadequate compressive strength, or load-carrying capacity.

Materials based on epoxy resins with glass cloth are known for their excellent strength and water-resisting properties, but their antifriction properties are below par.

The present invention, therefore, seeks to provide a polymeric material combining high water resistance and high strength with adequate antifriction properties for use in friction members designed to withstand specific pressures of up to 400 kg/sq.cm. and sliding speeds of up to 0.1 m/sec. in water and oil media.

The foregoing object is attained by the provision of a composition for an antifriction material which, in accordance with the invention, comprises the following components, parts by weight:

| | |
|---|---|
| epoxy binder | 36 – 48 |
| glass cloth or fibreglass | 42 – 44 |
| polytetrafluoroethylene of crystallinity 0.60 | 8 – 22 |

The epoxy binder is an epoxy resin of molecular weight from 360 to 470 containing 20 percent by weight of epoxy groups, which includes 20 parts by weight of dibutylphthalate plasticizer and 10 to 12 parts by weight of polyethylenepolyamine curing agent per 100 parts by weight of the resin.

The polytetrafluoroethylene is present in the composition in the form of 0.3 to 1.5 cu.mm. particles.

The specific particle size is selected within said limits depending on the friction surface area of the contacting parts.

The composition of this invention is prepared by way of mechanical mixing of said ingredients in said proportions.

In accordance with the invention, there is provided an antifriction material designed for use in sliding-friction members at specific pressures of from 250 to 400 kg/sq.cm. and sliding speeds of from 0.004 to 0.1 m/sec, said antifriction material being formed as a cured composition containing the above ingredients taken in the above proportions.

So, the proposed antifriction material is an epoxy fibreglass-reinforced plastic with polytetrafluoroethylene particles embedded therein.

The material of this invention can be advantageously employed in sliding friction members under lubrication-free conditions as well as with the use of water and turbine oil lubrication.

The compound of the above composition may be cured either at room temperature or at a temperature from 100° to 150°C.

The preparation and curing of the proposed composition may be actually combined with the manufacture of objects therefrom.

Also falling within the scope of the present invention are objects manufactured from the proposed material or those coated with said antifriction material about the friction surfaces thereof.

The above objects may be sliding bearings, inserts, guide linings, bushings or bearing rings.

The proposed antifriction material was tested on a laboratory testing unit simulating a full-scale friction member in the form of a bushing at specific pressures of from 250 to 400 kg/sq.cm. and a sliding speed of 0.004 m/sec. under lubrication-free conditions as well as with the use of water or mineral oil lubrication.

Over the entire 50 hours of the testing period, the friction coefficient stayed below 0.06; whereas while testing a bronze member lubricated with a consistent grease, all other conditions being equal, the working surface showed signs of incipient destruction.

Experimental specimens of a sliding bearing constructed from the material of this invention were tested under actual operating conditions over a prolonged period of time to exhibit excellent antifriction properties and practically absolute wear resistance.

Depending on the size and shape of manufactured objects, there are proposed two basic production processes:

a. moulding of glass cloth or fibreglass impregnated with said epoxy binder containing particles of said polytetrafluoroethylene;

b. impregnation of glass cloth strips with an epoxy binder containing said polytetrafluoroethylene particles and pasting the thus obtained material on the friction surface.

The invention will be further understood from the following exemplary embodiments thereof.

EXAMPLE 1

40 parts by weight of epoxy binder, 42 parts by weight of glass cloth and 18 parts by weight of polytetrafluoroethylene of particle size 1 cu.mm. are thoroughly mixed, loaded into an appropriate mould, moulded at a specific pressure of 500 kg/sq.cm. and allowed to stand in said mould for 24 hours at room temperature.

In order to speed up the curing procedure, the mould containing the material may be subjected to heating to 100° – 150°C.

This technique was employed to manufacture bushings measuring up to 200 mm in diameter for the bearings of hydraulic turbine stators, as well as support rings for bearings.

EXAMPLE 2

The starting ingredients are 48 parts by weight of epoxy binder, 40 parts by weight of glass cloth in the form of strips and 12 parts by weight of polytetrafluoroethylene of particle size 0.5 cu.mm.

The glass cloth strips are impregnated with the epoxy binder containing the polytetrafluoroethylene particles and then applied, one by one, onto a prepared friction surface.

The composition is cured for 24 hours at room temperature, with the material adhering to the friction surface of the object as the curing progresses.

In this way, the friction surfaces of hydraulic turbine bearings up to 400 mm in diameter were coated with 3-mm layers of the proposed antifriction material.

The material of Example 1 has a density of approximately 1.6 g/cu.cm. and a compressive strength of approximately 1,200 kg/sq.cm; the material of Example 2 has a density of approximately 1.4 g/cu.cm. and a compressive strength of approximately 1,000 kg/sq.cm.

Thus, as is demonstrated by the foregoing examples, the antifriction material of this invention is prepared, cured and made into a manufactured object, all in a single process.

The materials obtained in the procedures described in Examples 1 and 2 were employed to manufacture sliding bearings tested at specific pressures of from 250 to 400 kg/sq.cm. and a sliding speed of 0.004 m/sec. Under lubrication-free conditions, the friction coefficient in the tests stayed below 0.06.

Sliding bearings coated with the proposed antifriction material about the friction surfaces thereof can be advantageously employed in the stators of highpower hydraulic turbines, e.g. rated at up to 700 megawatts.

What is claimed is:

1. A composition for antifriction materials, comprising the following components, parts by weight:

| | |
|---|---|
| epoxy binder | 36 – 48 |
| glass cloth or fibreglass | 42 – 44 |
| polytetrafluoroethylene of crystallinity 0.60 | 8 – 22. |

2. A composition as claimed in claim 1, wherein the epoxy binder is an epoxy resin of molecular weight from 360 to 470 and containing 20 percent of epoxy groups, which includes 20 parts by weight of dibutylphthalate plasticizer and 10 to 12 parts by weight of polyethylenepolyamine curing agent per 100 parts by weight.

3. A composition as claimed in claim 1, wherein the polytetrafluoroethylene is present in the form of particles from 0.3 to 1.5 cu.mm. in size.

4. An antifriction polymeric material for use in friction members at specific pressures of up to 400 kg/sq.cm. and sliding speeds of up to 0.1 m/sec., which is formed as a cured composition comprising the following ingredients, parts by weight:

| | |
|---|---|
| epoxy binder | 36 – 48 |
| glass cloth or fibreglass | 42 – 44 |
| polytetrafluoroethylene of crystallinity 0.60 and particle size from 0.3 to 1.5 cu.mm. | 8 – 22. |

5. An antifriction polymeric material as claimed in claim 4, wherein the epoxy binder is an epoxy resin of molecular weight from 360 to 470 containing 20 percent by weight of epoxy groups, which includes 20 parts by weight of dibutylphthalate and 10 to 12 parts by weight of polyethylenepolyamine per 100 parts by weight.

6. A manufactured object for sliding-friction members constructed from a material as claimed in claim 4.

7. A manufactured object for sliding-friction members coated on the surface thereof with a material as claimed in claim 4.

* * * * *